United States Patent
Kikutake et al.

(10) Patent No.: US 7,366,971 B2
(45) Date of Patent: Apr. 29, 2008

(54) SEMICONDUCTOR MEMORY HAVING SUB-PARTY CELL ARRAY ERROR CORRECTION

(75) Inventors: Akira Kikutake, Kawasaki (JP); Kuninori Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 481 days.

(21) Appl. No.: 11/092,704

(22) Filed: Mar. 30, 2005

(65) Prior Publication Data

US 2006/0156214 A1 Jul. 13, 2006

(30) Foreign Application Priority Data

Dec. 21, 2004 (JP) .............................. 2004-369504

(51) Int. Cl.
*G06F 11/00* (2006.01)
(52) U.S. Cl. ........................... 714/801; 714/703
(58) Field of Classification Search .................. 714/5, 714/30, 42, 48, 54, 715, 719, 733, 734, 742, 714/763, 766, 800, 807; 365/200, 201
See application file for complete search history.

(56) References Cited

U.S. PATENT DOCUMENTS 4,878,220 A * 10/1989 Hashimoto .................. 714/703
6,009,026 A * 12/1999 Tamlyn et al. .............. 365/201
6,163,863 A * 12/2000 Schicht ....................... 714/718
6,262,924 B1 * 7/2001 Fukutani et al. ............. 365/200
7,032,142 B2 * 4/2006 Fujioka et al. .............. 714/718

FOREIGN PATENT DOCUMENTS

JP        62-119800        6/1987

* cited by examiner

*Primary Examiner*—Jacques Louis-Jacques
*Assistant Examiner*—Sam Rizk
(74) *Attorney, Agent, or Firm*—Arent Fox, LLP.

(57) ABSTRACT

Disposed on both sides of a parity cell array are a first regular cell array and a sub parity generation circuit therefor, and a second regular cell array and a sub parity generation circuit therefor. The sub parity generation circuit generates sub parity data according to read data that are simultaneously read from the first and second regular cell arrays. A main parity generation circuit generates according to sub parity data parity data in common to the regular cell arrays, is not disposed in a distributed manner but disposed corresponding to the parity cell array. Thus, the layout design, layout verification, and so forth of a semiconductor memory can be prevented from being complexed. As a result, the parity generation circuit can be optimally laid out, decreasing the development time and defect analysis time for the semiconductor memory can be decreased.

9 Claims, 10 Drawing Sheets

SEMICONDUCTOR MEMORY HAVING SUB-PARTY CELL ARRAY ERROR CORRECTION

CROSS REFERENCE TO RELATED APPLICATION

This application is based upon and claims the benefit of priority from Japanese Patent Application No. 2004-369504, filed on Dec. 21, 2004, the entire contents of which are incorporated herein by reference.

BACKGROUND OF THE INVENTION

1. Field of the Invention

The present invention relates to a semiconductor memory having an error correction function.

2. Description of the Related Art

In a semiconductor memory having an error correction function, a technology that decreases the number of signal lines through which sub parity data are transferred has been proposed (for example, Japanese Unexamined Patent Application Publication No. Sho 62-119800). In this technology, sub parity data of read data are generated for each memory block. The sub parity data are successively combined. Thereafter, parity data are generated.

When parity data are generated by successively combining sub parity data, a plurality of parity generation circuits (parity verification circuits) are needed to combine sub parity data. Thus, the layout design, layout verification, and so forth of the semiconductor memory become complicated.

SUMMARY OF THE INVENTION

An object of the present invention is to optimally lay out a parity generation circuit so as to decrease the development time for a semiconductor memory. Another object of the present invention is to optimally allocate, for the purpose of the optimal layout, syndromes that decide a logic of the parity generation circuit.

According to an aspect of the present invention, a first regular cell array, a sub parity generation circuit for the first regular cell array, and a first external data terminal are disposed on one side of a parity cell array. A second regular cell array, a sub parity generation circuit for the second regular cell array, and a second external data terminal are disposed on the other side of the parity cell array. A main parity generation circuit is disposed corresponding to the parity cell array. The sub parity generation circuits generate sub parity data according to read data that are simultaneously read from the first and second regular cell arrays. The main parity generation circuit generates, according to the sub parity data, the parity data common to the first and second regular cell arrays. A syndrome generation circuit generates a syndrome according to parity data read from the parity cell array and to parity data generated by the main parity generation circuit. A read error correction circuit corrects read data read from the first and second regular cell arrays, according to the syndrome.

The bit width of data of the first and second regular cell arrays is equal to the bit width of the first and second external data terminals. Data supplied to the first external data terminals are written to any one of the first regular cell arrays in accordance with the address received from an address terminal. Data supplied to the second external data terminals are written to any one of the second regular cell arrays according to the address. The main parity generation circuit is not disposed in a distributed manner but disposed at a position corresponding to the parity cell array. Thus, it is possible to prevent the layout design, the layout verification, and so forth of the semiconductor memory from being complicated.

According to a preferred example of the aspect of the present invention, first and second regular cell arrays have a same address allocated thereto and they compose regular cell array pairs. A syndrome value composed of a plurality of bits is allocated to bits of data that are input and output from and to the regular cell array pairs. In the regular cell array pairs first sub syndrome values, composed of a predetermined number of bits of the syndrome value, are the same when external data terminal numbers corresponding to the values are the same. Second sub syndrome values are composed of the remaining bits of the syndrome value, and they are the same in each of the regular cell array pairs. Logics of the sub parity generation circuits and the main parity generation circuit are composed in accordance with the allocation of the syndrome value. Allocating a syndrome in accordance with the regular cell arrays and the external data terminals can facilitate the logics of the sub parity generation circuit and the main parity generation circuit. As a result, the circuit structure can be simplified.

According to a preferred example of the aspect of the present invention, a read data selection circuit selects data that are output to the first and second external data terminals from read data that are read from the first and second regular cell arrays according to an address. The read error correction circuit corrects an error in read data selected by the data selection circuit only, not read data that are read from the first and second regular cell array. Thus, since the circuit scale of the read error correction circuit is decreased, the chip size can be decreased.

According to a preferred example of the aspect of the present invention, a read syndrome decoder identifies, according to the syndrome and the address, the first or second external data terminals corresponding to bit data that has an error. The read error correction circuit has an inverting circuit that inverts bit data corresponding to a data terminal identified by the read syndrome decoder so as to correct an error in the bit data. As a result, the read error correction circuit can be simply configured.

According to a preferred example of the aspect of the present invention, write error correction circuits are disposed between the first and second regular cell arrays and the sub parity generation circuits. The write error correction circuits correct an error in read data that are read from the first and second regular cell arrays in response to a write request, output the corrected data to the sub parity generation circuits along with write data supplied to the first and second external data terminals, and output read data that are read from the first and second regular cell arrays in response to a read request to the sub parity generation circuits. The sub parity generation circuits and the main parity generation circuit generate not only parity data of data that are written to the first and second regular cell arrays but also parity data of data that are read from the first and second regular cell arrays. Since the same sub parity generation circuit and main parity generation circuit are used in the write operation and the read operation, the circuit scale of the parity generation circuit can be decreased.

According to a preferred example of the aspect of the present invention, a write syndrome decoder identifies a bit with an error, in accordance with a syndrome generated from read data that are read from the first and second regular cell arrays in response to the write request. The write error correction circuit has an inverting circuit that inverts bit data of the read data, the bit data being identified by the write syndrome decoder. According to the present invention, parity data are in common to data stored in the first and second regular cell arrays. Thus, whenever the write operation is performed, it is necessary to read data from the regular cell array to which data are not written so as to re-generate parity data. The write syndrome decoder and the write error correction circuit allow parity data to be securely updated in response to an error in data stored in the regular cell array to which data are not written.

According to a preferred example of the aspect of the present invention, the write error correction circuit has a latch circuit that holds read data containing bit data identified by the write syndrome decoder. Thus, even if timing at which write data are supplied through the first and second external data terminals deviates from timing at which read data are read from the first and second regulator cell arrays in response to a write request, parity data can be securely generated using the write data and the read data held in the latch circuit.

According to a preferred example of the aspect of the present invention, a pair of memory units each of which has the parity cell array, the first and second regular cell arrays, the sub parity generation circuits, the main parity generation circuit, the syndrome generation circuit, and the read error correction circuit. The main parity generation circuit of each of the memory units has a sub parity hold circuit, a sub parity operational circuit, a main parity hold circuit, and a main parity operational circuit. The sub parity hold circuit holds the sub parity data. The sub parity operational circuit generates difference parity data that indicate differences between sub parity data held in the sub parity hold circuit and sub parity data newly generated by the sub parity generation circuits. The main parity hold circuit holds the parity data. The main parity operational circuit performs an arithmetic operation on parity data held in the main parity hold circuit and the differential parity data and generates new parity data.

In this example, parity data can be updated according to difference parity data of sub parity data of newly supplied write data. Thus, when write operation is alternately performed for the memory units, data are read from the regular cell array at the first access so that at the second access parity data can be generated without need to read data from the regular cell array. As a result, time necessary for the second access can be decreased.

According to a preferred example of the aspect of the present invention, regular cell array pairs are composed of first and second regular cell arrays having a same address allocated thereto. The semiconductor memory has a burst write function of serial-to-parallel converting write data that are supplied to the first and second external data terminals a predetermined number of times successively and writing converted data to all of the regular cell array pairs of the memory units. The received write data are written on the memory unit basis. The sub parity operational circuit and the main parity operational circuit operate only when data are written to only one regular cell array pair in each of the memory units in the burst operation. The sub parity hold circuit and the sub parity operational circuit are formed corresponding to the only one regular cell array pair.

Assuming that each memory unit has four regular cell array pairs and that a burst write operation (burst length="8") is successively performed from the second regular cell array of the first memory unit, the last write data are written to the first regular cell array pair of the first memory unit. On the other hand, when the first memory unit receives write data of the fourth regular cell array, the first read data that has been read and the second to fourth write data are written to respective regular cell array pairs. At this point, sub parity data of read data are held in the sub parity hold circuit and parity data are held in the main parity hold circuit. As a result, parity data containing last write data corresponding to the first regular cell array pair can be generated without need to read data from the regular cell array pair. Thus, since time necessary for the last write operation can be decreased, burst write cycle time can be decreased. In addition, the amount of sub parity data supplied to the main parity generation circuit is decreased by the sub parity generation circuit. Thus, since the number of bits held by the sub parity hold circuit can be decreased, the circuit scale of the sub parity hold circuit can be decreased.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3 is a schematic diagram describing allocations of syndrome codes;

FIG. 8 is a schematic diagram describing an outline of intermediate parity data that the main parity generation circuit shown in FIG. 7 generates;

DESCRIPTION OF THE PREFERRED EMBODIMENTS

Figure 1:
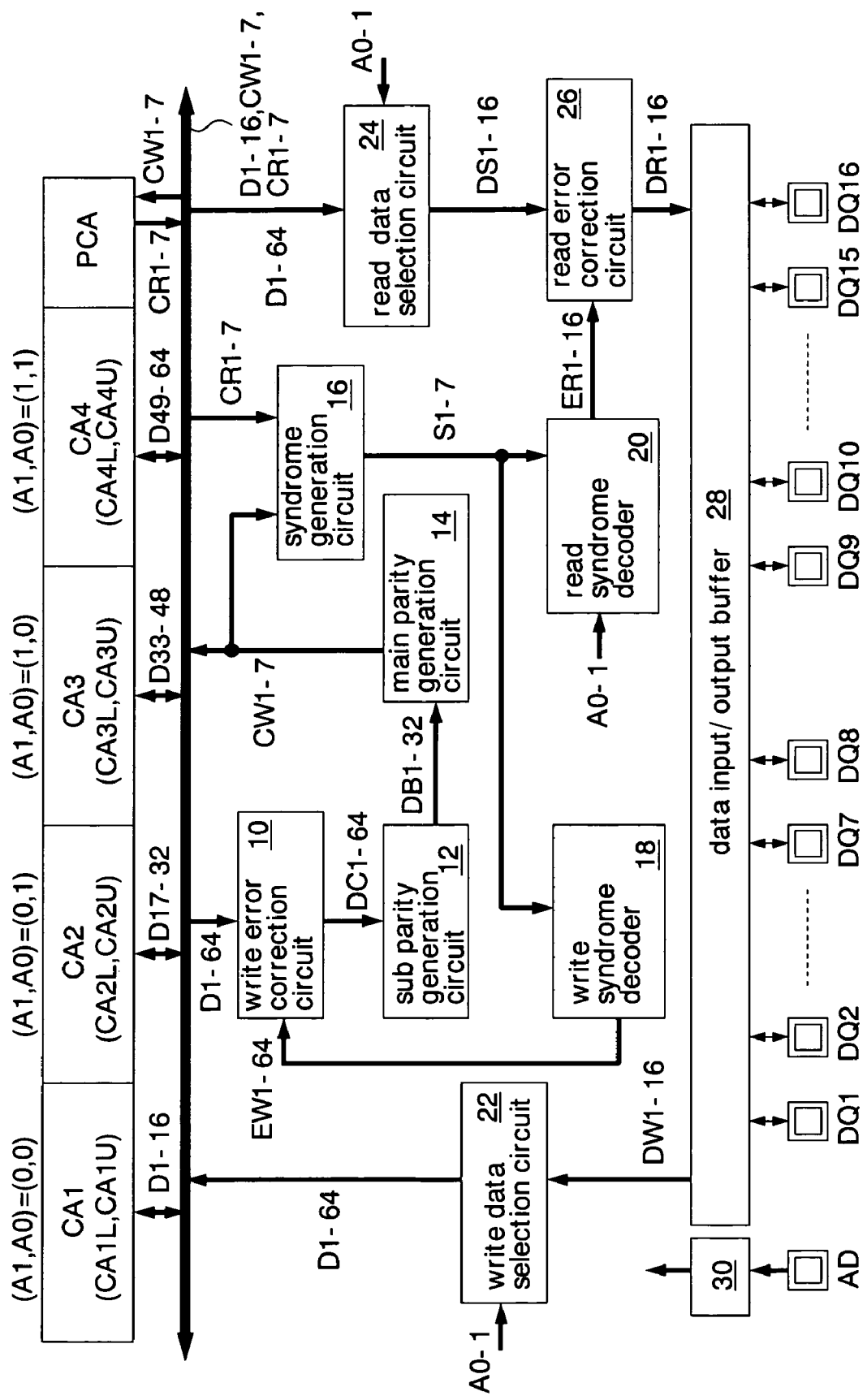
FIG. 1 is a block diagram showing a semiconductor memory according to a first embodiment of the present invention.

Next, with reference to the accompanying drawings, embodiments of the present invention will be described. In the drawings, double square marks indicate external data terminals (pads). In the drawings, a solid signal line is composed of a plurality of lines. A part of a block to which a solid line is connected is composed of a plurality of circuits. A signal supplied through an external terminal is identified with the same symbol as the terminal name. A signal line that transmits a signal is identified with the same symbol as the signal name.

FIG. 1 shows a semiconductor memory according to a first embodiment of the present invention. The semiconductor memory is composed as a pseudo SRAM that is produced on a silicon substrate by the CMOS process. The pseudo SRAM has a memory core of a DRAM and an interface of an SRAM.

The pseudo SRAM has regular cell arrays CA1-4, a parity cell array PCA, a write error correction circuit 10, a sub parity generation circuit 12, a main parity generation circuit 14, a syndrome generation circuit 16, a write syndrome decoder 18, a read syndrome decoder 20, a write data selection circuit 22, a read data selection circuit 24, a read error correction circuit 26, a data input and output buffer 28, and an address buffer 30. The regular cell arrays CA1-4 store data supplied through external data terminals DQ1-16. The parity cell array PCA stores parity data.

In addition, the pseudo SRAM has an address decoder, a command buffer, a command decoder, an operation control circuit, and so forth. The command buffer receives operation commands (write command, read command, and so forth). The command decoder decodes operation commands. The operation control circuit generates control signals with which a write operation, a read operation, and a refresh operation for the cell arrays CA1-4 and PAC are controlled.

Like a regular DRAM, the regular cell arrays CA1-4 and the parity cell array PCA have dynamic memory cells. The dynamic memory cells each have a capacitor and a transfer transistor. The capacitor stores data as an electric charge. The transfer transistor connects the capacitor to a bit line.

The regular cell arrays CA1 and CA2-4 are composed of a pair of regular cell arrays CA1L and CA1U, a pair of regular cell arrays CA2L and CA2U, a pair of regular cell arrays CA3L and CA3U, and a pair of regular cell arrays CA4L and CA4U, respectively. The bit width of data of the regular cell arrays CA1L-CA4L and CA1U-CA4U is the same as the bit width of the first and second external data terminals DQ1-8 and DQ9-16. Write data supplied to the first external data terminals DQ1-8 (lower bytes) are stored in one of the regular cell arrays CA1L-CA4L with suffix "L" (first regular cell array) corresponding to address A1-0. Write data supplied to the second external data terminals DQ9-16 (high order bytes) are stored in one of the regular cell arrays CA1U-CA4U with suffix "U" (second regular cell array).

When the lowest order two bits (A1, A0) of an address are (0, 0), the regular cell array CA1 is accessed. Likewise, when (A1, A0) of an address are (0, 1), (1, 0), and (1, 1), the regular cell arrays CA2-4 are accessed, respectively. Whenever a write operation is performed, write data supplied to the external data terminals DQ1-16 are written to one of the regular cell arrays CA1-4 selected corresponding to the address A1-0.

Whenever a read operation is performed, 16 bits selected from 64 bits of data that are read from the regular cell arrays CA1-4 corresponding to the address A1-0 are output to the external data terminals DQ1-16.

The parity cell array PCA stores parity bits of seven bits (parity data) corresponding to 64 bits of data stored in the regular cell arrays CA1-4. Parity data CW1-7 written to the parity cell array PCA are generated by the main parity generation circuit 14. Read parity data CR1-7 that are read from the parity cell array PCA are output to the syndrome generation circuit 16.

In a read operation in response to an external read request, the write error correction circuit 10 outputs data D1-64 that are read from the regular cell arrays CA1-4 as correction data DC1-64. In a write operation in response to an external write request, the write error correction circuit 10 corrects data D1-64 that are read from the regular cell arrays CA1-4 corresponding to bit values of write error detection data EW1-64. The write error correction circuit 10 has an inverting circuit (not shown) that inverts the logic of an error bit identified by the write syndrome decoder to correct the error. The inverting circuit is composed of for example an EOR circuit. The write error correction circuit 10 outputs bit data (one bit of DC1-64) corrected by the inverting circuit to the sub parity generation circuit 12 along with other bits of data supplied to the external data terminals DQ1-16 (remaining bits that are not corrected in DC1-64). Data D1-64 should be read from the regular cell arrays CA1-4 in the write operation so that the parity cell array PCA stores parity data for 64 bits of data that are written to the regular cell arrays CA1-4.

The write error correction circuit 10 has a latch circuit (not shown) that holds read data that contains bit data identified by the write syndrome decoder 18. Thus, it is not necessary to synchronize timing of write data supplied through the external data terminals DQ1-16 with timing of read data that are read from the regular cell arrays CA1-4 in response to a write request. As a result, with write data and read data held in the latch circuit, parity data can be securely generated. Thus, the timing design of the pseudo SRAM can be easily performed. In addition, the timing specifications of the pseudo SRAM can be set so that the user can easily use them. Moreover, in the write operation, when write data that are written to the regular cell arrays CA1-4 are successively supplied to the external data terminals DQ1-16 (for example, a burst write operation of the second embodiment, that will be described later), the data can be securely held by the latch circuit.

The sub parity generation circuit 12 generates sub parity data DB1-32 (byte parity) with the correction data DC1-64. Details of the sub parity generation circuit 12 will be described later with reference to FIG. 4 and FIG. 5. The main parity generation circuit 14 generates write parity data CW1-7 with the sub parity data DB1-32 generated by the sub parity generation circuit 12. Details of the main parity generation circuit 14 will be described later with reference to FIG. 7.

The syndrome generation circuit 16 exclusive-ORs the write parity data CW1-7 and the read parity data CR1-7 and generates a syndrome S1-7. The write syndrome decoder 18 identifies an error bit corresponding to the syndrome S1-7 to correct an error in the data D1-64 that are read from the regular cell arrays CA1-4. The write syndrome decoder 18 sets a bit of write error detection data EW (for example, EW1) to a logical level that is different from that of the other bits (for example, EW2-64).

During the read operation, the read syndrome decoder 20 determines whether 16 bits of read data that are output to the external data terminals DQ1-16 have bit errors corresponding to the syndrome S1-7 and the address A1-0. In other words, the read syndrome decoder 20 identifies an external terminal DQ (one of DQ1-16) corresponding to an error bit of data corresponding to the syndrome S1-7 and the read address A1-0. The read syndrome decoder 20 sets a bit of error detection data ER (for example, ER7) corresponding to an error bit of data to a logic level that is different from that of the other bits (for example, ER1-6 and 8-16).

During the write operation, the write data selection circuit 22 outputs write data DW1-16 supplied through the external data terminals DQ1-16 to data lines D1-16, 17-32, 33-48, or 48-64 corresponding to the address A1-0. During the read operation, the read data selection circuit 24 outputs 16 bits selected from read data D1-64 that are read from the regular cell arrays CA1-4 corresponding to the address A1-0 as selection data DS1-16 that are output to the external data terminals DQ1-16.

The read error correction circuit 26 has an inverting circuit (not shown) that inverts bit data corresponding to a data terminal DQ (one of DQ1-16) identified by the read syndrome decoder 20 so as to correct an error in the bit data. The inverting circuit is composed of for example an EOR circuit or the like. In the read error correction circuit 26, the inverting circuit inverts one bit of the selection data DS1-16 corresponding to read error detection data ER1-16 so as to correct an error and outputs the error correction data as read data DR1-16.

During the write operation, the data input and output buffer 28 outputs data supplied to the external data terminals DQ1-16 as the write data DW1-16. During the read operation, the data input and output buffer 28 outputs the read data DR1-16, 16 bits, to the external data terminals DQ1-16. The address buffer 30 receives an address for a memory cell from and to which data are read and written through an address terminal AD.

Figure 2:
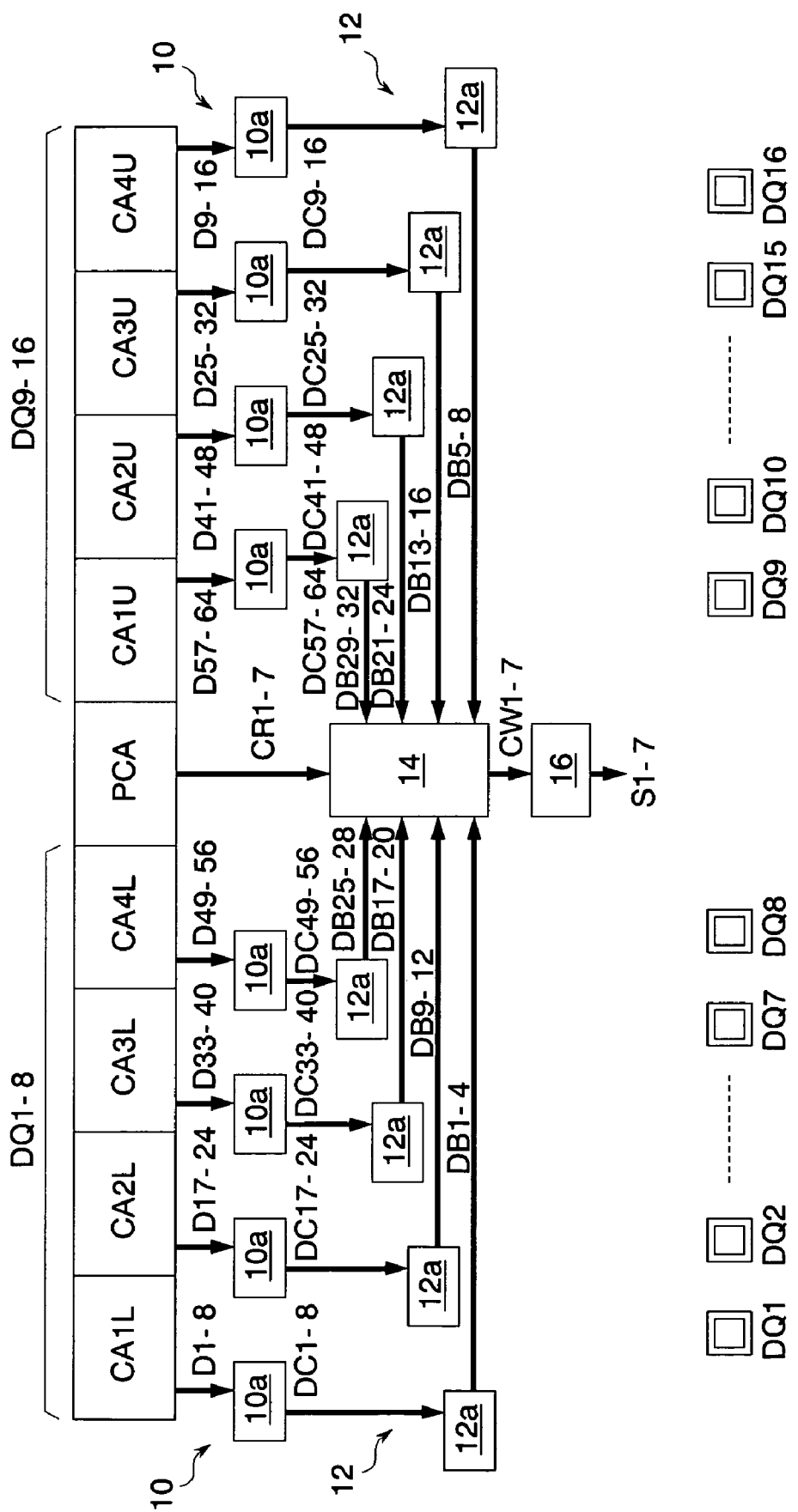
FIG. 2 is a block diagram showing a layout of essential parts of FIG. 1.

FIG. 2 shows a layout of the cell arrays CA1-4, the PCA, the write error correction circuit 10, the sub parity generation circuit 12, the main parity generation circuit 14, and the syndrome generation circuit 16 on the pseudo SRAM chip. The external data terminals DQ1-8 and the cell arrays A1L-4L corresponding thereto are disposed on one side (on the left side of the drawing) of the parity cell array PCA. The external data terminals DQ9-16 and the cell arrays CA1U-4U corresponding thereto are disposed on the other side (on the right side of the drawing) of the parity cell array PCA.

The bit width of data of the regular cell arrays CA1L-CA4L (first regular cell array), CA1U-CA4U (second regular cell array), and the parity cell array PCA is eight bits and they have the same circuit and the same layout. One of eight bits of the storage area of each of the regular cell arrays and the parity cell array PCA is not used. A same address is allocated to the regular cell arrays CA1L and CA1U (CA2L and CA2U, CA3L and CA3U, or CA4L and CA4U).

The write error correction circuit 10 and the sub parity generation circuit 12 are composed of eight write error correction circuits 10a and eight sub parity generation circuits 12a, respectively, corresponding to cell arrays CA1L-4L and CA1U-4L. The write error correction circuits 10a and the sub parity generation circuits 12a are disposed at positions opposite to the cell arrays CA1L-4L and CA1U-4U. The main parity generation circuit 14 and the syndrome generation circuit 16 are laid out at nearly the center of the pseudo SRAM chip. Since the main parity generation circuit 14 and the syndrome generation circuit 16 are disposed at one position, the efficiency of the layout design of the pseudo SRAM can be improved.

As shown in the drawing, the regular cell arrays CA1L-4L that store data D1-8 supplied to the external data terminals DQ1-8 and circuits corresponding thereto are disposed on the same side as the external data terminals DQ1-8. The regular cell arrays CA1U-4U that store data D9-16 supplied to the external data terminals DQ9-16 are disposed on the same side as the external data terminals DQ9-16.

According to the present invention, a circuit that generates parity data is composed of the sub parity generation circuits 12a corresponding to the regular cell arrays CA1L-4L and CA1U-4U and the main parity generation circuit 14. The number of bits (four bits) of sub parity data DB that are output from each of the sub parity generation circuits 12a is half the number of bits (eight bits) of correction data DC that are input to each of the sub parity generation circuits 12a. The amount of information of data transferred to the main parity generation circuit 14 is halved by the sub parity generation circuits 12a. Since the number of signal lines for the sub parity data DB that are output from the sub parity generation circuits 12a to the main parity generation circuit 14 is halved, the wiring area can be decreased and thereby the chip size of the pseudo SRAM can be decreased.

Figure 3:
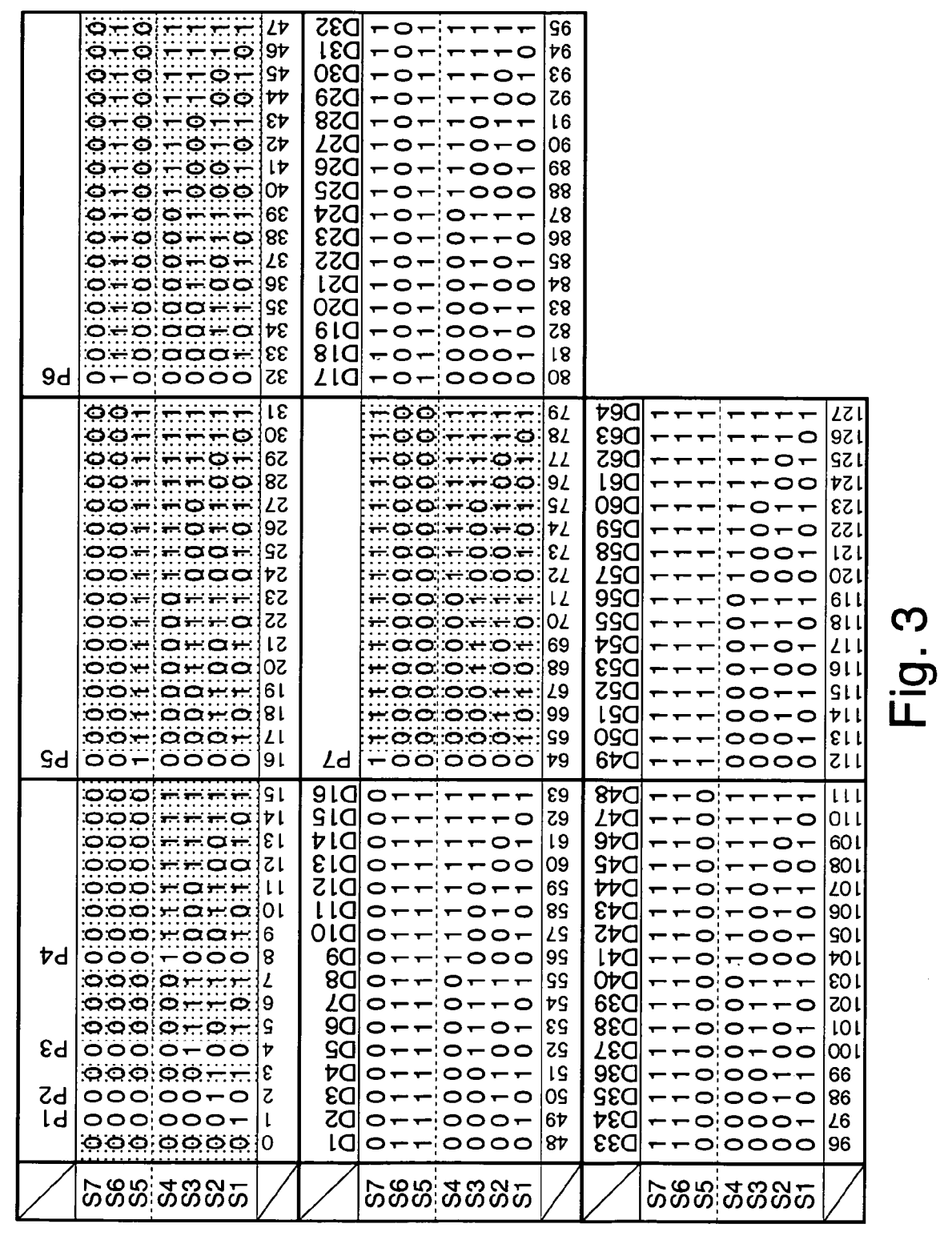

FIG. 3 shows codes of the syndrome S1-7 allocated to the data D1-64, 64 bits, stored in the regular cell arrays CA1-4 and parity data P1-7 stored in the parity cell array PCA. In the drawing, hatched codes indicate codes that are not used. Numerals below codes indicate values in decimal notation.

Codes corresponding to the syndrome S4-1 (first sub syndrome) are the same in all the cell arrays CA1-4 for each external data terminal DQ. For example, in each of the cell arrays CA1-4, all codes of data D5, D21, D37, and D53 corresponding to the external data terminal DQ5 are allocated to "0100."

Codes corresponding to the syndrome S7-5 (second sub syndrome) are common in the cell arrays CA1-4. In other words, all codes of data D1-16 corresponding to the cell array CA1 are "011". Likewise, codes of data D7-32 corresponding to the cell arrays CA2-4 are "101," "110," and "111," respectively.

The logics of the foregoing sub parity generation circuit 12 and main parity generation circuit 14 are configured corresponding to code allocations shown in FIG. 3. The codes are allocated corresponding to a predetermined rule. With the syndrome S4-1, four bits, an external data terminal DQ at which an error occurs can be identified. In addition, with the syndrome S7-5, three bits, the regular cell arrays CA1-4 in which an error occurs can be identified.

Figure 4:
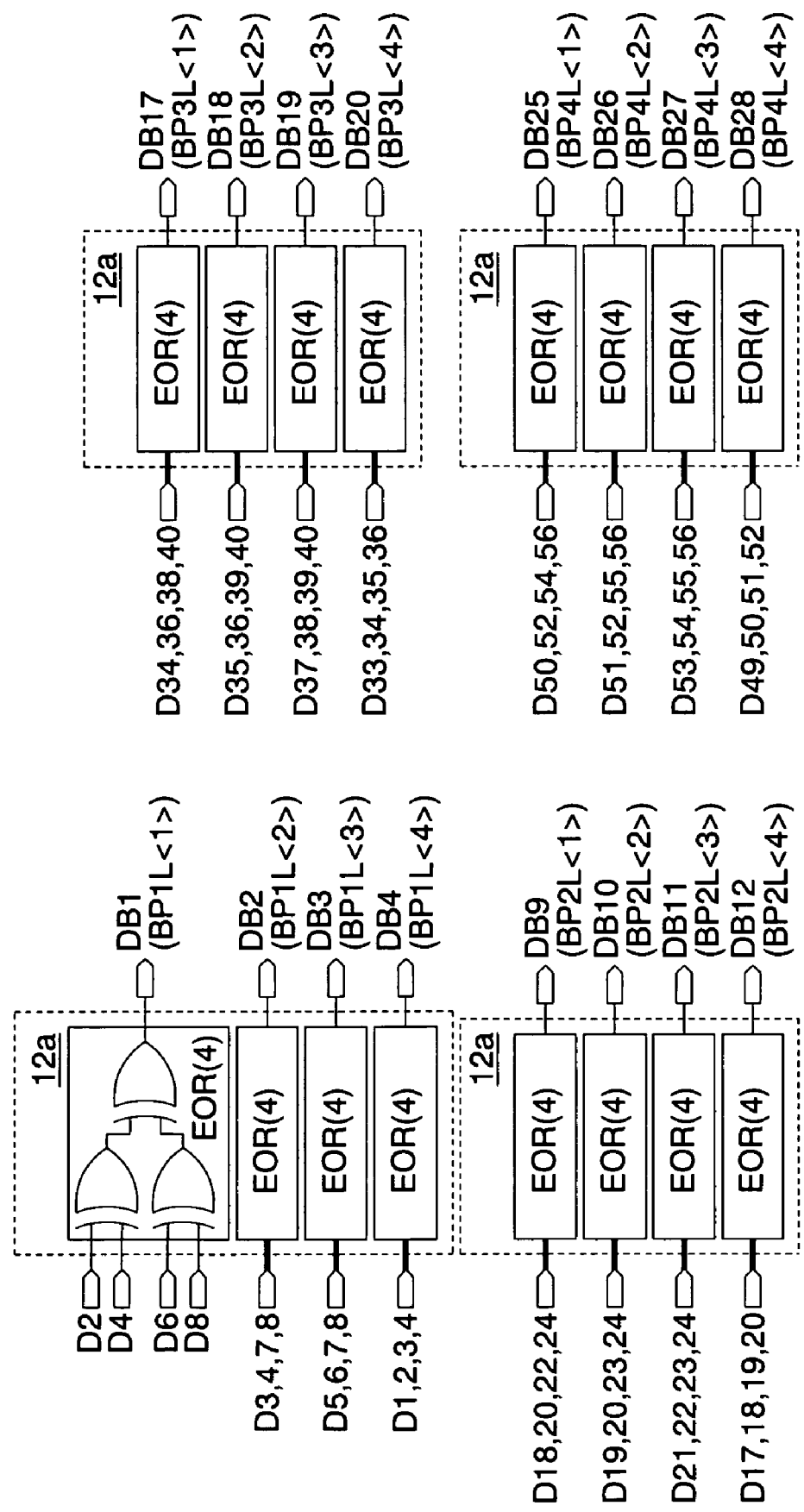
FIG. 4 is a circuit diagram showing details of a sub parity generation circuit shown in FIG. 1.
Figure 5:
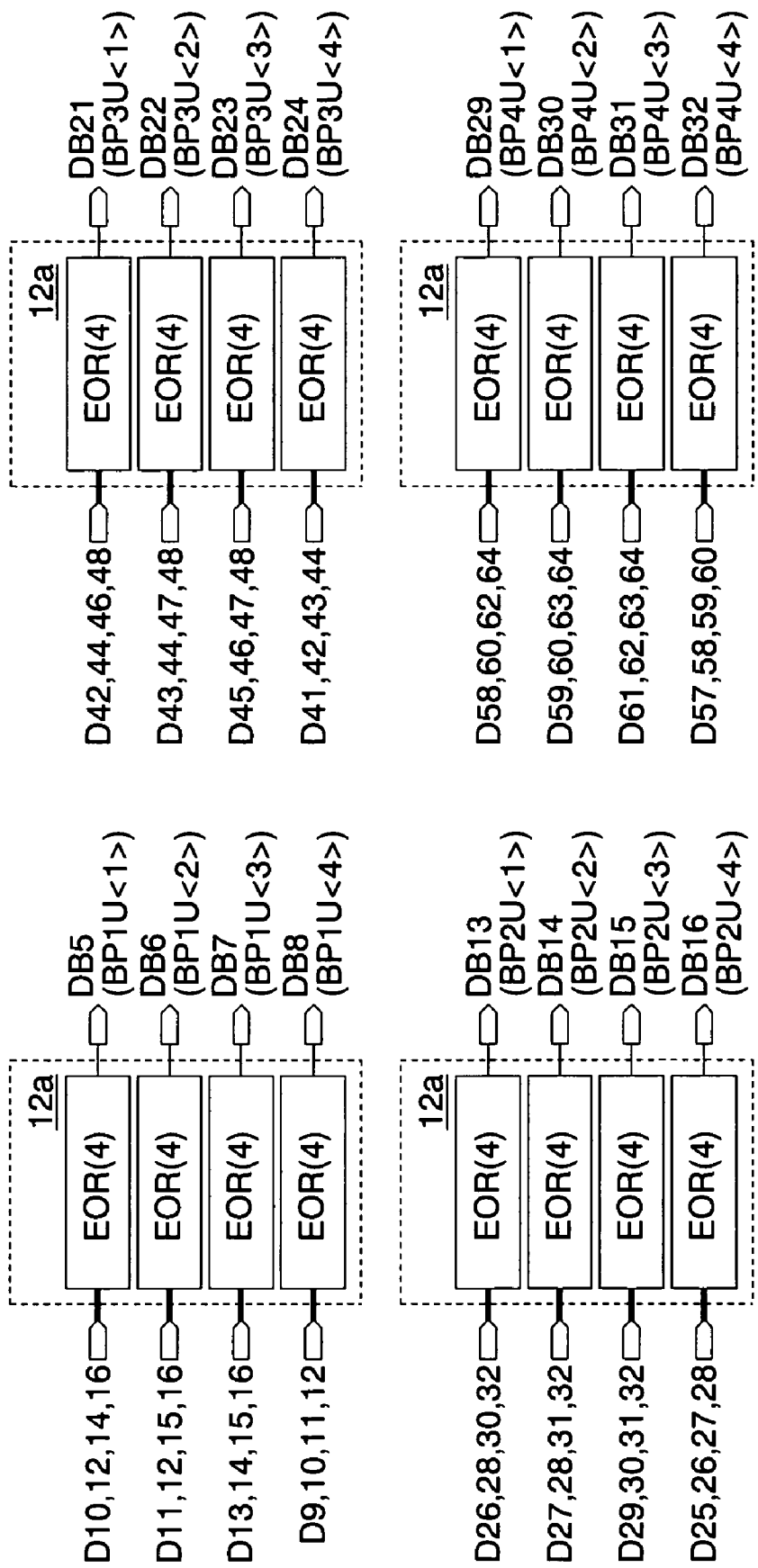
FIG. 5 is a circuit diagram showing details of the sub parity generation circuit shown in FIG. 1.

FIG. 4 and FIG. 5 show details of the sub parity generation circuits 12a shown in FIG. 1. Each of the sub parity generation circuits 12a has four 4-input EOR circuits. Each of the sub parity generation circuits 12a generates four bits of sub parity data DB with eight bits of data. In the following description, sub parity data DB1-32 will be also denoted by byte parity BPmL<n>, BPmU<n> (m, n: 1, 2, 3, 4) where "m" corresponds to the number of the regular cell array CA1-4.

Figure 6:
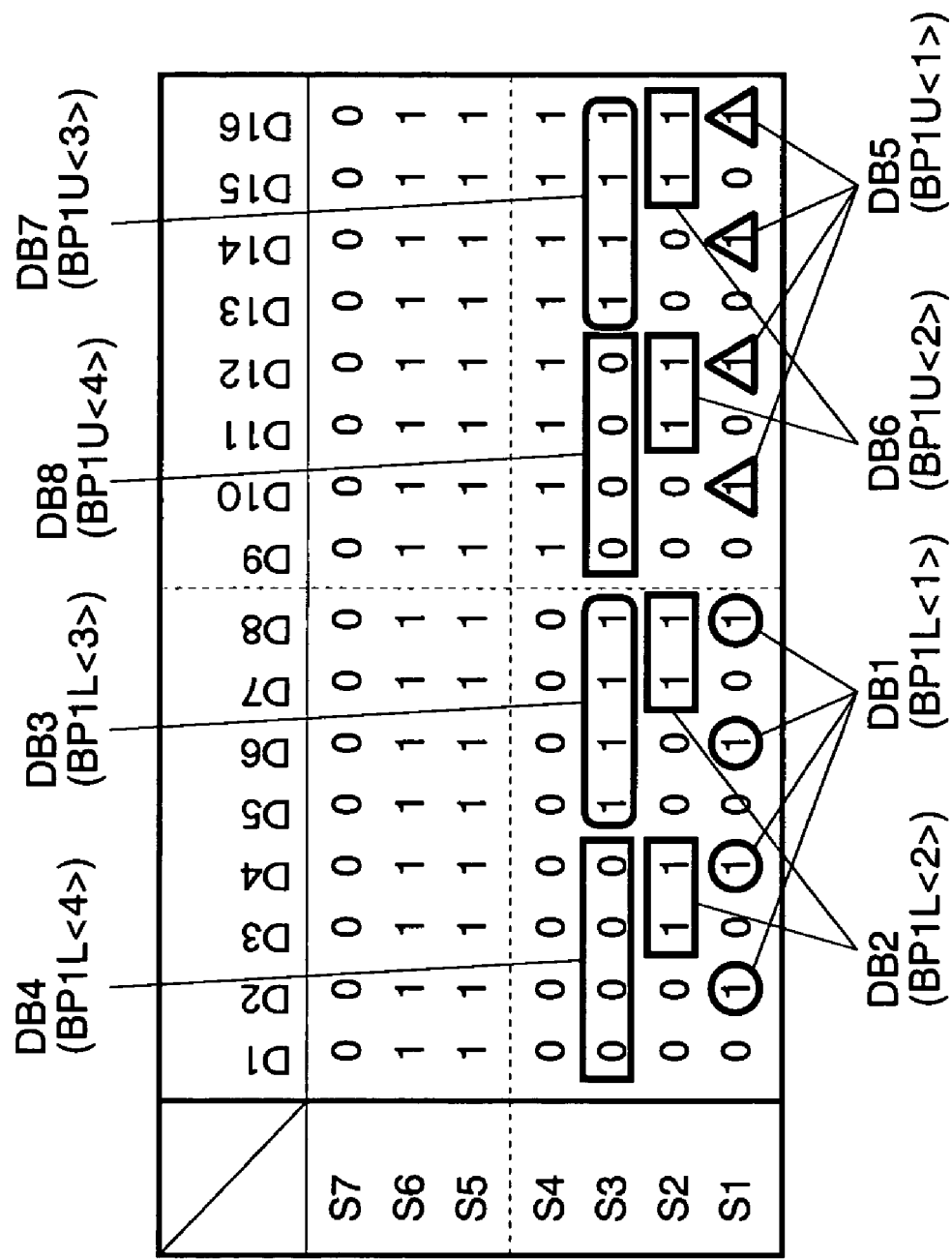
FIG. 6 is a schematic diagram describing an outline of byte parity that the sub parity generation circuit shown in FIG. 4 and FIG. 5 generates.

FIG. 6 shows an outline of byte parity that the sub parity generation circuits 12a shown in FIG. 4 and FIG. 5 generate. This drawing shows byte parities BP1L<1>-BP1L<4>, BP1U<1>-BP1U<4>.

The byte parity BP1L<1> (=DB1) is generated by exclusive-ORing data D2, D4, D6, and D8 whose syndrome S1 is "1" in data D1-8. The byte parity BP1U<1> (=DB5) is generated by exclusive-ORing data D10, D12, D14, and D16 whose syndrome S1 is "1" in data D9-16. The byte parity BP1L<2> (=DB2) is generated by exclusive-ORing data D3, D4, D7, and D8 whose syndrome S2 is "1" in data D1-8. The byte parity BP1U<2> (=DB6) is generated by exclusive-ORing data D11, D12, D15, and D16 whose syndrome S2 is "1" in data D9-16.

The byte parity BP1L<3> (=DB3) is generated by exclusive-ORing data D5-8 whose syndrome S3 is "1" in data D1-8. The byte parity BP1U<3> (=DB7) is generated by exclusive-ORing data D13-16 whose syndrome S3 is "1" in data D9-16. The byte parity BP1L<4> (=DB4) is generated by exclusive-ORing data D1-4 whose syndrome S3 is "0" in data D1-8. The byte parity BP1U<4>=(DB8) is generated by exclusive-ORing data D9-12 whose syndrome S3 is "0" in data D9-16. The byte parities BP of the regular cell arrays CA2-4 can be represented by the same solid frames as those shown in FIG. 6 except that the values of the syndrome S5-7 are different.

Figure 7:
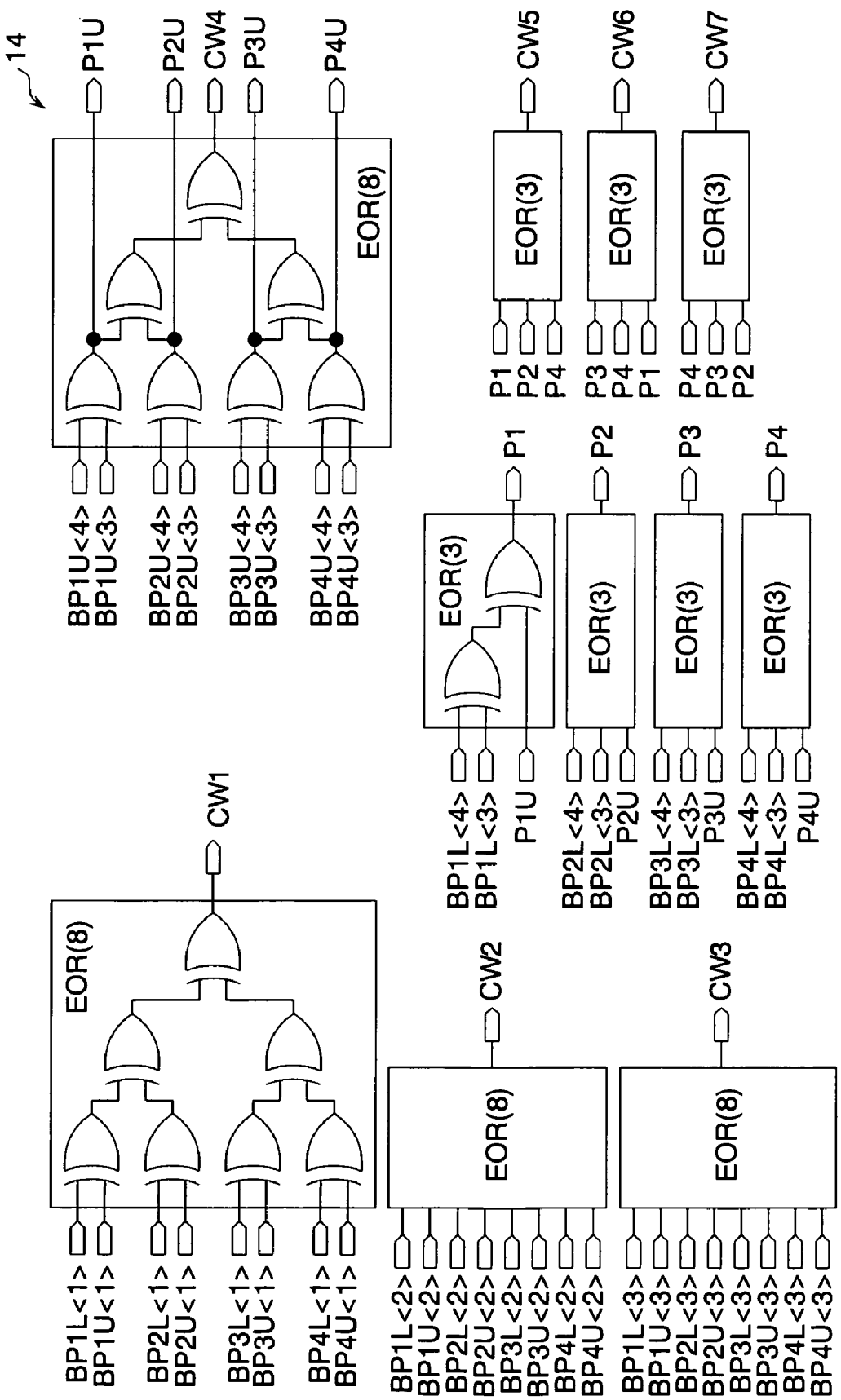
FIG. 7 is a circuit diagram showing details of a main parity generation circuit shown in FIG. 1.

FIG. 7 shows details of the main parity generation circuit 14 shown in FIG. 1. The main parity generation circuit 14 is composed of four 8-input EOR circuits and seven 3-input EOR circuits. The four 8-input EOR circuits generate write parity data CW1-4. The seven 3-input EOR circuits generate write parity data CW5-7.

The write parity data CW1-7 can be obtained by exclusive-ORing data D whose syndrome codes are allocated to "1" in FIG. 3. The main parity generation circuit 14 performs this operation with 32 byte parities BPmL<n>, BPmU<n> generated by the sub parity generation circuits 12a and generates write parity data CW1-7. In other words, the main parity generation circuit 14 generates parity data CW1-7 that are in common to the regular cell arrays CA1-4 corresponding to sub parity data DB1-32.

The 8-input EOR circuits that generate write parity data CW4 also generate intermediate parity data P1U, P2U, P3U, and P4U necessary to generate write parity data CW5-7. The four 3-input EOR circuits that receive the intermediate parity data P1U, P2U, P3U, and P4U generate intermediate parity data P1, P2, P3, and P4 necessary to generate write parity data CW5-7.

Figure 8:
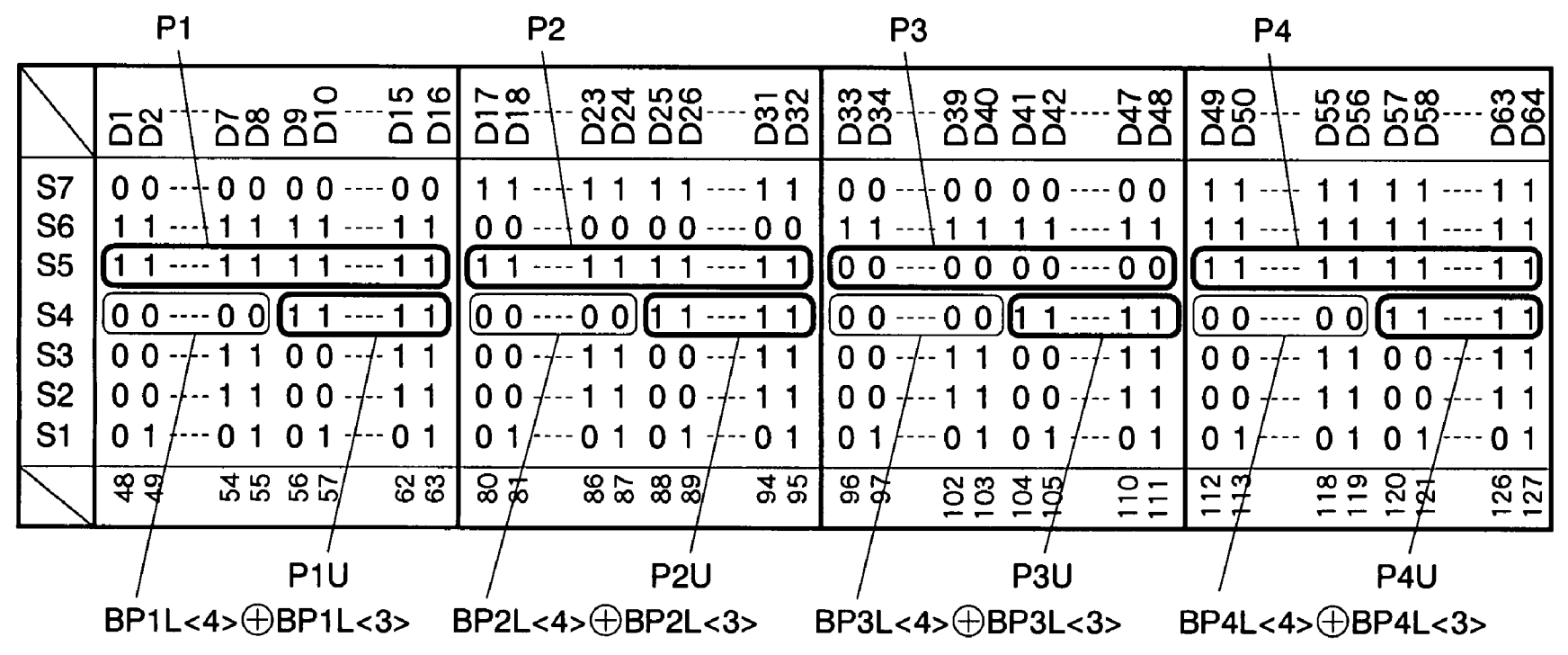

FIG. 8 shows an outline of intermediate parity data that the main parity generation circuit 14 shown in FIG. 7 generates. In the drawing, a crossed circle indicates an exclusive OR operator. The intermediate parity data P1U are generated by exclusive-ORing data D1-16 whose syndrome S4 is "1" in data D1-16. The intermediate parity data P2U are generated by exclusive-ORing data D25-32 whose syndrome S4 is "1" in data D17-32. The intermediate parity data P3U are generated by exclusive-ORing data D41-48 whose syndrome S4 is "1" in data D33-48. The intermediate parity data P4U are generated by exclusive-ORing data D57-64 whose syndrome S4 is "1" in data D49-64.

The intermediate parity data P1 are generated by exclusive-ORing data D1-16 whose syndrome S5 is "1." The intermediate parity data P2 are generated by exclusive-ORing data D17-32 whose syndrome S5 is "1." The intermediate parity data P3 are generated by exclusive-ORing data D33-48 whose syndrome S5 is "0." The intermediate parity data P4 are generated by exclusive-ORing data D49-64 whose syndrome S5 is "1."

Next, the read operation and write operation of the pseudo SRAM of this embodiment will be described. When the pseudo SRAM receives a read request (read command), the pseudo SRAM reads 16 bits of data D1-16, D17-32, D33-48, and D49-64 from the regular cell arrays CA1-4, respectively, and parity data CR1-7 from the parity cell array PCA. After the read data D1-64 has passed through the write error correction circuit 10, the sub parity generation circuit 12 and the main parity generation circuit 14 generate parity data CW1-7. The syndrome generation circuit 16 compares the parity data CW1-7 with the parity data CR1-7 that are read from the parity cell array PCA, respectively, and generates the syndrome S1-7.

Next, the read syndrome decoder 20 generates read error detection data ER1-16 corresponding to the syndrome S1-7. The read data selection circuit 24 selects 16 bits of read data that are output from a regular cell array CA (one of CA1-4) selected by the address A1-0 supplied along with the read command and outputs the read data as selection data DS1-16. The read error correction circuit 26 corrects error bit data corresponding to the read error detection data ER1-16 and outputs the corrected data as read data DR1-16. The data input and output buffer 28 outputs the read data DR1-16 to the external data terminals DQ1-16. Now, the read operation has been completed.

On the other hand, when the pseudo SRAM receives a write request (write command), like the read operation, the pseudo SRAM reads data D1-64 from the regular cell arrays CA1-4 and parity data CR1-7 from the parity cell array PCA. Thereafter, the pseudo SRAM performs the same operation until the syndrome generation circuit 16 has generated the syndrome S1-7. During the write operation, the write syndrome decoder 18 operates. The write syndrome decoder 18 decodes the syndrome S1-7. The write syndrome decoder 18 generates write error detection data EW1-64 corresponding to the syndrome S1-7. The write error correction circuit 10 corrects a bit error in the read data D1-64 corresponding to the write error detection data EW1-64.

After the pseudo SRAM has completed the error correction operation, the data input and output buffer 28 outputs write data DW1-16 received from the external data terminals DQ1-16 to the write data selection circuit 22. The write data selection circuit 22 transfers the data to a regular cell array CA (one of CA1-4) selected corresponding to the address A1-0 supplied along with the write command. The write data DW1-16, 16 bits, are written to one of the regular cell arrays CA1-4. At this point, a write amplifier of the regular cell array CA to which the data are written latches the write data DW1-16. Write amplifiers of the three regular cell arrays CA to which the data are not written continuously latch the data that have been read.

64 bits of data D1-64 of which the write data and the read data are combined pass through the write error correction circuit 10 once again. Thereafter, the data D1-64 are transferred to the sub parity generation circuit 12. The sub parity generation circuit 12 and the main parity generation circuit 14 generate parity data CW1-7. The generated parity data CW1-7 are written to the parity cell array PCA. Now, the write operation has been completed.

Thus, according to this embodiment, since the main parity generation circuit 14 is not distributed, but disposed opposite to the parity cell array PCA, the layout design, the layout verification, and so forth of the pseudo SRAM can be prevented from becoming complicated.

Since the syndrome S1-7 is divided into S1-4 and S5-7 as shown in FIG. 3 and they are allocated to the external data terminals DQ1-16 and the regular cell arrays CA1-4, the logics of the sub parity generation circuit 12 and the main parity generation circuit 14 can have regularity. Thus, these circuits can be simply configured.

In the read operation, since only data that are actually output to the external data terminals DQ1-16 are corrected for an error in 64 bits of read data, the circuit scale of the read error correction circuit 26 can be decreased. Thus, the chip size of the pseudo SRAM can be decreased.

Since the sub parity generation circuit 12 and the main parity generation circuit 14 are used in common in not only the read operation but the write operation, the parity generation circuits 12 and 14 can be prevented from being redundantly configured. Thus, their circuit scale of the pseudo SRAM can be decreased.

According to the present invention, the parity cell array in common to the regular cell arrays CA1-4 is disposed. Write data supplied to the external data terminals DQ1-16 are written to one of the regular cell arrays CA1-4 corresponding to the address A1-0. This architecture requires that before data are written to the regular cell arrays CA1-4, the data should be read from the regular cell arrays CA1-4 in response to a write request. At this point, the write syndrome decoder 18 and the write error correction circuit 10 can securely update parity data corresponding to an error in data stored in a regular cell array to which data are not written.

Since a latch circuit is disposed in the write error correction circuit 10, during the write operation, it is not necessary to supply data that are read from the regular cell arrays CA1-4 to the write error correction circuit 10 in synchronization with write data that are read from the regular cell arrays CA1-4. Since sub parity data DB1-32 are generated from data latched in the latch circuit, the timing design of a circuit that generates parity data can be easily performed. In addition, since the operation margin of the circuits can be obtained, the yield of the pseudo SRAM can be improved.

Figure 9:
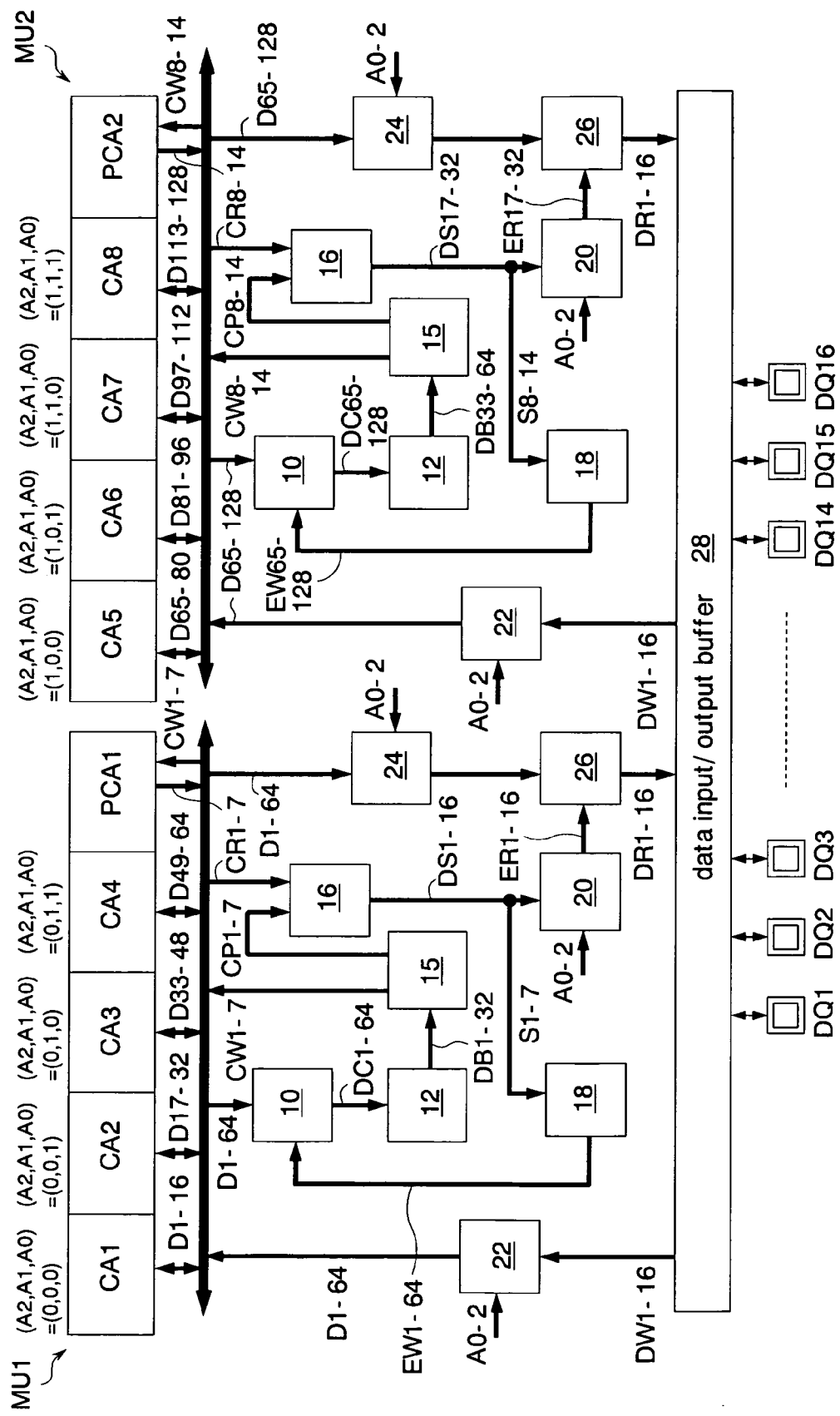
FIG. 9 is a block diagram showing a semiconductor memory according to a second embodiment of the present invention.

FIG. 9 shows a semiconductor memory according to a second embodiment of the present invention. In the drawing, the same elements as those described in the first embodiment are denoted by the same reference numeral and their detailed description will be omitted. The semiconductor memory is composed as a pseudo SRAM that is produced on a silicon substrate by the CMOS process.

The pseudo SRAM has a pair of memory units MU1 and MU2. Each of the memory units MU1-2 has a write error correction circuit 10, a sub parity generation circuit 12, a main parity generation circuit 15, a syndrome generation circuit 16, a write syndrome decoder 18, a read syndrome decoder 20, a write data selection circuit 22, a read data selection circuit 24, and a read error correction-circuit 26. The syndrome generation circuit 16 receives parity data CP1-7 (or CP8-14) that are output from the parity generation circuit 15 rather than parity data CW1-7 (or CW8-14).

The memory unit MU1 has regular cell arrays CA1-4 (regular cell array pair) and a parity cell array PCA1. The parity cell array PCA1 stores parity data of data written to the regular cell arrays CA1-4. The memory unit MU2 has regular cell arrays CA5-8 (regular cell array pair) and a parity cell array PCA2. The parity cell array PCA2 stores parity data of data written to the regular cell arrays CA5-8.

The regular cell arrays CA5-8 are circuits that are same as those of the regular cell arrays CA1-4. The regular cell arrays CA5-8 are composed of regular cell arrays CA5L, CA5U, CA6L, CA6U, CA7L, CA7U, CA8L, and CA8U. The parity cell arrays PCA1-2 are the same circuits as that of the parity cell array PCA of the first embodiment. The memory units MU1-2 have the same circuit arrangement as that shown in FIG. 2 except for the relationship with the external data terminals DQ1-16. As shown in FIG. 9, the semiconductor memory of this embodiment has two sets of major circuit elements (as memory units MU1-2) that are the same as that of the first embodiment (FIG. 1). The data input and output buffer 28, the address buffer 30, and the external data terminals DQ1-16 are elements in common in the memory units MU1-2.

The regular cell arrays CA1-4 are allocated to address A2="0." The regular cell arrays CA5-8 are allocated to address A2="1." As shown in the drawing, the regular cell arrays CA1-8 are selected corresponding to the values of the address (A2, A1, and A0) and the selected regular cell array CA is accessed. The memory units MU1-2 simultaneously operate. In the write operation, write data supplied to the external data terminals DQ1-16 are written to one of the regular cell arrays CA1-8. In the read operation, 16 bits of 128 bits of data that are read from the regular cell arrays CA1-8 are output to the external data terminals DQ1-16 corresponding to the address. In the write operation and read operation, parity data are generated for each of the memory units MU1-2.

Figure 10:
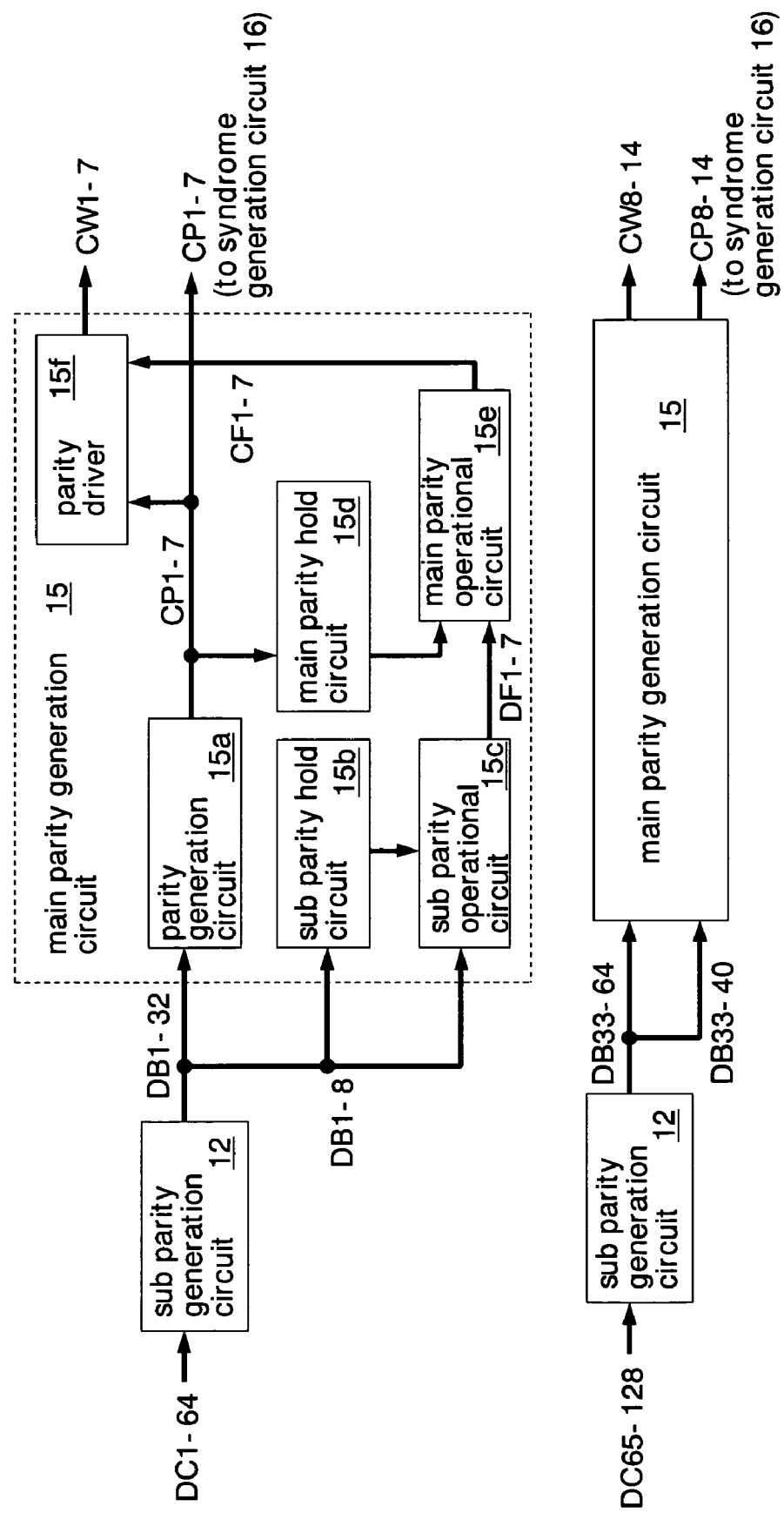
FIG. 10 is a block diagram showing details of a main parity generation circuit shown in FIG. 9.

FIG. 10 shows details of the main parity generation circuits 15 shown in FIG. 9. Each of the main parity generation circuits 15 has a parity generation circuit 15*a*, a sub parity hold circuit 15*b*, a sub parity operational circuit 15*c*, a main parity hold circuit 15*d*, a main parity operational circuit 15*e*, and a parity drive circuit 15*f*.

The parity generation circuit 15*a* has the same function as the main parity generation circuit 14 of the first embodiment. The parity generation circuit 15*a* generate parity data CP1-7 of sub parity data DB1-32 received from the sub parity generation circuit 12. The sub parity hold circuit 15*b* has an 8-bit latch circuit that holds the sub parity data DB1-8 corresponding to the regular cell array CA1 (or CA5). The amount of information of the sub parity data DB1-32 supplied to the main parity generation circuit 15 is decreased to the half of the original data D1-64 by the sub parity generation circuit 12. Thus, the number of bits that the sub parity hold circuit 15*b* holds can be decreased and the circuit scale of the sub parity hold circuit 15*b* can be decreased.

The sub parity operational circuit 15*c* compares the sub parity data DB1-8 held in the sub parity hold circuit 15*b* with newly generated sub parity data DB1-8 and generates difference sub parity data. DF1-7. The difference sub parity data DF1-7 correspond to the parity data CP1-7, respectively. The difference sub parity data DF1-7 are parity data generated from only two pieces of the sub parity data DB1-8.

The main parity hold circuit 15*d* has a 7-bit latch circuit that holds the parity data CP1-7 generated by the parity generation circuit 15*a*. The main parity operational circuit 15*e* corrects the parity data CP1-7 held in the main parity hold circuit 15*d* corresponding to the difference sub parity data DF1-7 and generates parity data CF1-7. The parity drive circuit 15*f* selects either the parity data CP1-7 or CF1-7 corresponding to the operation state and outputs the selected parity data as parity data CW1-7.

The sub parity hold circuit 15*b*, the sub parity operational circuit 15*c*, the main parity hold circuit 15*d*, and the main parity operational circuit 15*e* operate only in the burst write operation that will be described later. In the read operation including the burst read operation, parity data generated by the parity generation circuit 15*a* are supplied to the syndrome generation circuit 16 that corrects an error in read data.

Next, the burst write operation of the pseudo SRAM of this embodiment will be described. The burst write operation is a function that serial-parallel converts write data DW1-16 successively supplied to the external data terminals DQ1-16 and writes the converted data to a plurality of the regular cell array pairs CA1-8. The pseudo SRAM has a burst read operation function that serial-parallel converts data that are simultaneously read from the regular cell array pairs CA1-8 and successively outputs the converted data to the external data terminals DQ1-16. The number of pieces of data that are input to and output from the external data terminals DQ1-16 is pre-set as a burst length to a mode register or the like of the pseudo SRAM. Next, an example of the case that the burst length is pre-set to "8" will be described. In this example, since the start address of the write operation is (A2, A1, A0)=(0, 0, 1), write data are received from the external data terminals DQ1-16 to the regular cell arrays CA2, CA3, CA4, CA5, CA6, CA7, CA8, and CA1 in the order.

When the write command is supplied to the pseudo SRAM, it reads data D1-64 from the regular cell arrays CA1-4 and parity data CR1-7 from the parity cell array PCA1. When the data D1-64 have an error, the write error correction circuit 10 corrects the error in the same manner as the first embodiment and outputs the corrected data as correction data DC1-64.

The write data selection circuit 22 transfers data DW1-16 that are successively written to the regular cell arrays CA2-4 to data buses D17-32, D33-48, and D49-64 corresponding to the address. In other words, the write data selection circuit 22 serial-parallel converts the data DW1-16. The sub parity generation circuit 12 generates sub parity data DB9-32 with the data D17-64. The parity generation circuit 15a generates parity data CP1-7 with pre-generated sub parity data DB1-8 and newly generated sub parity data DB9-32.

The parity data CP1-7 are written as parity data CW1-7 to the parity cell array PCA1 in synchronization with the third write data to be written to the regular cell array CA4. The write data D1-16 are written for each of the memory units MU. In addition, the write data D1-64 are written to the regular cell arrays CA1-4. At this point, the parity data CW1-7 and the write data D1-64 are written to a predetermined memory cell through column selection lines selected corresponding to the address. The data D1-16 written to the regular cell array CA1 are read from the regular cell array CA1 at the beginning of the write data. The sub parity hold circuit 15b latches the sub parity data DB1-8 corresponding to the regular cell array CA1. The main parity hold circuit 15d latches the parity data CP1-7. At this point, the sub parity operational circuit 15c and the main parity operational circuit 15e do not operate.

Thereafter, the pseudo SRAM reads data D65-128 from the regular cell arrays CA5-8 and parity data CR8-14 from the parity cell array PCA2. When the read data D65-128 have an error, the write error correction circuit 10 corrects the error and outputs the corrected data as correction data DC65-128. The write data selection circuit 22 transfers successively supplied data DW1-16 that are written to the regular cell arrays CA5-8 to the data buses D65-80, 81-96, 97-112, and 113-128 corresponding to the address. The sub parity generation circuit 12 generates sub parity data DB33-64 with the data D65-128. The parity generation circuit 15a generates parity data CP8-14 with the sub parity data DB33-64. At this point, the sub parity operational circuit 15c, the main parity hold circuit 15d, and the main parity operational circuit 15e do not operate. The sub parity hold circuit 15b may or may not latch the sub parity data DB33-64.

The parity data CP8-14 are written as parity data CW8-14 to the parity cell array PCA2 in synchronization with the seventh write data that are written to the regular cell array CA8. In addition, the write data D65-128 are written to the regular cell arrays CA5-8. The parity data CW8-14 and the write data D65-128 are written to a predetermined memory cell through column selection lines corresponding to the address.

Next, the pseudo SRAM receives the eighth write data D1-16. The write data selection circuit 22 transfers the write data DW1-16 to the data buses D1-16 corresponding to the address. The sub parity generation circuit 12 for the write data D1-16 generates sub parity data DB1-8 with the data D1-16. The sub parity operational circuit 15c generates difference sub parity data DF1-7 that indicate the differences between the sub parity data DB1-8 held in the sub parity hold circuit 15b and sub parity data DB1-8 newly generated by the sub parity generation circuit 12. The main parity operational circuit 15e affects the difference parity data DF1-7 to parity data CP1-7 held in the main parity hold circuit 15d and generates new parity data CF1-7. Thus, the sub parity operational circuit 15c, the main parity hold circuit 15d, and the main parity operational circuit 15e operate in response to only the last write data written to the regular cell array CA1 in the burst write operation. The new parity data CF1-7 are equal to parity data that are generated from 48 bits of data supplied as the first to third write data written to the regular cell arrays CA2-4 and 16 bits of data supplied as the eighth write data. In other words, the new parity data CF1-7 can be generated without need to use the sub parity data DB9-32 for the regular cell arrays CA2-4. The parity drive circuit 15f outputs the parity data CF1-7 as parity data CW1-7.

The parity data CW1-7 are written to the parity cell array PCA1 in synchronization with the eighth write data written to the regular cell array CA1. In addition, the write data D1-64 are written to the regular cell arrays CA1-4. Write data corresponding to the regular cell arrays 1-4 are the first to third write data held in write amplifiers (not shown) of the regular cell arrays 1-4. According to this embodiment, in the burst write operation for the regular cell array CA2 (or CA6), when 64 bits of data including the last write data are written to the regular cell array CA1 (or CA5), it is not necessary to read data from the regular cell arrays CA1-4 (or CA5-8) and the parity cell array PCA1 (or PCA2). Thus, the last write operation can be completed in one cycle period as a data supply period for the burst write operation.

According to this embodiment, the same effect as the first embodiment can be obtained. In addition, according to this embodiment, in the last write operation of the burst write operation, the new parity data CF1-7 can be generated without need to read data from the regular cell arrays CA2-4. Thus, when data have been read from the regular cell arrays CA1-4 in the first access operation, the parity data CF1-7 can be generated without need to read data from the regular cell arrays CA1-4 in the second access operation. As a result, time necessary for the second access operation can be decreased. In the burst write operation, the last write operation can be completed in one cycle period regardless of the burst start address. Thus, the burst write cycle period can be decreased. In addition, the amount of information of the sub parity data DB1-32 (or DB33-64) supplied to the main parity generation circuit 15 can be decreased by the sub parity generation circuit 12. Thus, the number of bits held in the sub parity generation circuit 12 can be decreased. Consequently, the circuit scale of the sub parity hold circuit can be decreased.

The foregoing embodiments describe examples of which the present invention is applied to the pseudo SRAM. However, the present invention is not limited to the foregoing embodiments. For example, when the present invention is applied to other semiconductor memories such as a DRAM, an SRAM, and a ferroelectric memory, the same effect as the foregoing embodiments can be obtained.

The invention is not limited to the above embodiments and various modifications may be made without departing from the spirit and scope of the invention. Any improvement may be made in part or all of the components.

What is claimed is:
1. A semiconductor memory, comprising:
a parity cell array to which parity data are written;
a plurality of first regular cell arrays disposed on one side of said parity cell array and to which a plurality of bits of write data are written;

a plurality of second regular cell arrays disposed on the other side of said parity cell array and to which a plurality of bits of write data are written;

a plurality of first external data terminals disposed on said one side so as to input and output data to and from said first regular cell arrays;

a plurality of second external data terminals disposed on said other side so as to input and output data to and from said second regular cell arrays;

an address terminal which receives an address to select a memory cell from which and to which data are read and written;

a plurality of sub parity generation circuits disposed corresponding to said first and second regular cell arrays and generating sub parity data according to read data which are read simultaneously from said first and second regular cell arrays;

a main parity generation circuit disposed corresponding to said parity cell array and generating said parity data according to said sub parity data, the parity data being common to said first and second regular cell arrays;

a syndrome generation circuit which generates a syndrome according to parity data read from said parity cell array and to parity data generated by said main parity generation circuit; and a read error correction circuit which corrects, according to said syndrome, read data read from said first and second regular cell arrays, wherein:

a bit width of data in said first and second regular cell arrays is equal to a bit width of said first and second external data terminals;

data supplied to said first external data terminals are written to any one of said first regular cell arrays in accordance with said address; and data supplied to said second external data terminals are written to any one of said second regular cell arrays in accordance with said address.

2. The semiconductor memory as set forth in claim 1, further comprising regular cell array pairs each composed of first and second regular cell arrays having a same address allocated thereto, wherein:

the value of said syndrome composed of a plurality of bits is allocated to bits of data which are input and output from and to said regular cell array pairs, the plurality of bits including first and second syndrome values;

in said regular cell array pairs the first sub syndrome values are the same when external data terminal numbers corresponding to the values are the same, and the second sub syndrome values are the same in each of said regular cell array pairs, the first sub syndrome values being composed of a predetermined number of bits of said syndrome value, the second sub syndrome values being composed of remaining bits of said syndrome value; and logics of said sub parity generation circuits and said main parity generation circuit are composed in accordance with the allocation of said syndrome value.

3. The semiconductor memory as set forth in claim 1, further comprising:

a read data selection circuit which selects, in accordance with an address, data to output to said first and second external data terminals from read data which are read from said first and second regular cell arrays, wherein said read error correction circuit corrects an error in read data selected by said data selection circuit only.

4. The semiconductor memory as set forth in claim 3, further comprising:

a read syndrome decoder which identifies, according to said syndrome and said address, said first or second external data terminals corresponding to bit data having an error, wherein said read error correction circuit has an inverting circuit which inverts bit data corresponding to an external data terminal identified by said read syndrome decoder so as to correct an error in the bit data.

5. The semiconductor memory as set forth in claim 1, further comprising:

write error correction circuits disposed between said first and second regular cell arrays and said sub parity generation circuits and correcting an error in read data which are read from said first and second regular cell arrays in response to a write request, outputting the corrected data to said sub parity generation circuits along with write data supplied to said first and second external data terminals, and outputting, to said sub parity generation circuits, without error correction, read data which are read from said first and second regular cell arrays in response to a read request, wherein said sub parity generation circuits and said main parity generation circuit generate not only parity data of data which are written to said first and second regular cell arrays, but parity data of data which are read from said first and second regular cell arrays.

6. The semiconductor memory as set forth in claim 5, further comprising:

a write syndrome decoder which identifies a bit having an error according to the syndrome generated from read data which are read from said first and second regular cell arrays in response to said write request, wherein said write error correction circuit has an inverting circuit which inverts bit data of said read data, said bit data being identified by said write syndrome decoder.

7. The semiconductor memory as set forth in claim 6, wherein said write error correction circuit has a latch circuit which holds read data containing bit data identified by said write syndrome decoder.

8. The semiconductor memory as set forth in claim 1, further comprising:

a pair of memory units each of which has said parity cell array, said first and second regular cell arrays, said sub parity generation circuits, said main parity generation circuit, said syndrome generation circuit, and said read error correction circuit, wherein said main parity generation circuit of each of said memory units has:

a sub parity hold circuit which holds said sub parity data;

a sub parity operational circuit which generates difference parity data indicating differences between sub parity data held in said sub parity hold circuit and sub parity data newly generated by said sub parity generation circuits;

a main parity hold circuit which holds said parity data; and a main parity operational circuit which performs an arithmetic operation on parity data held in said main parity hold circuit and said differential parity data and generates new parity data.

9. The semiconductor memory as set forth in claim 8, further comprising regular cell array pairs composed of first and second regular cell array having a same address allocated thereto, wherein:

the semiconductor memory has a burst write function of serial-to-parallel converting write data supplied to said first and second external data terminals a predetermined number of times successively and of writing converted data to all of said regular cell array pairs of said memory units, and writes received write data on the memory unit basis;

said sub parity operational circuit and said main parity operational circuit operate only when data are written to only one regular cell array pair in each of said memory units in the burst write operation; and said sub parity hold circuit and said sub parity operational circuit are formed corresponding to the only one regular cell array pair.

\* \* \* \* \*